United States Patent
Falk et al.

(10) Patent No.: US 11,134,072 B2
(45) Date of Patent: Sep. 28, 2021

(54) METHOD FOR VERIFYING A SECURITY CLASSIFICATION OF A FIRST DEVICE USING A DIGITAL CERTIFICATE, A FIRST AND SECOND DEVICE AND CERTIFICATE ISSUING APPARATUS

(71) Applicant: SIEMENS AKTIENGESELLSCHAFT, Munich (DE)

(72) Inventors: Rainer Falk, Poing (DE); Steffen Fries, Baldham (DE)

(73) Assignee: SIEMENS AKTIENGESELLSCHAFT

( * ) Notice: Subject to any disclaimer, the term of this patent is extended or adjusted under 35 U.S.C. 154(b) by 203 days.

(21) Appl. No.: 16/069,202

(22) PCT Filed: Dec. 22, 2016

(86) PCT No.: PCT/EP2016/082310
§ 371 (c)(1),
(2) Date: Jul. 11, 2018

(87) PCT Pub. No.: WO2017/121602
PCT Pub. Date: Jul. 20, 2017

(65) Prior Publication Data
US 2019/0028466 A1 Jan. 24, 2019

(30) Foreign Application Priority Data
Jan. 14, 2016 (DE) .................... 10 2016 200 382.8

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3268* (2013.01); *H04L 63/20* (2013.01);
(Continued)

(58) Field of Classification Search
CPC ... H04L 63/0823; H04L 63/20; H04L 9/3268; H04W 12/0505; G06F 21/33; G06F 21/44
(Continued)

(56) References Cited

U.S. PATENT DOCUMENTS 7,509,489 B2* 3/2009 Kostal .................... G06F 21/33
713/156
8,131,997 B2* 3/2012 Chang .................... G06F 21/57
713/156
(Continued)

FOREIGN PATENT DOCUMENTS

CN 101151871 A 3/2008
CN 102932333 A 2/2013
(Continued)

OTHER PUBLICATIONS

PCT International Search Report and Written Opinion of International Searching Authority dated Feb. 3, 2017 corresponding to PCT International Application No. PCT/EP2016/082310 filed Dec. 22, 2016.
(Continued)

*Primary Examiner* — Longbit Chai
(74) *Attorney, Agent, or Firm* — Schmeiser, Olsen & Watts LLP (57) ABSTRACT

Provided is a method for checking a safety rating of a first device with the aid of an associated digital certificate, including the steps: sending the digital certificate having an identifier of a safety rating from the first device to a second device, checking the identifier of the safety rating with respect to a predefined safety rule by means of the second
(Continued)

device, executing safety measures in accordance with the result of checking the safety rules.

13 Claims, 3 Drawing Sheets

(51) Int. Cl.
  *G06F 21/44* (2013.01)
  *G06F 21/33* (2013.01)
  *H04W 12/67* (2021.01)
(52) U.S. Cl.
  CPC .............. *G06F 21/33* (2013.01); *G06F 21/44* (2013.01); *H04W 12/67* (2021.01)
(58) Field of Classification Search
  USPC .......................................................... 726/7
  See application file for complete search history.

(56) References Cited

U.S. PATENT DOCUMENTS

| | | | |
|---|---|---|---|
| 8,341,717 B1 | 12/2012 | Delker et al. | |
| 8,954,732 B1 | 2/2015 | Watsen et al. | |
| 8,990,891 B1 | 3/2015 | Chickering et al. | |
| 9,438,583 B2* | 9/2016 | Suzuki | H04L 63/062 |
| 2005/0076204 A1 | 4/2005 | Thornton et al. | |
| 2006/0048228 A1 | 3/2006 | Takemori et al. | |
| 2007/0006288 A1 | 1/2007 | Mayfield et al. | |
| 2008/0072052 A1 | 3/2008 | Suzuki | |
| 2008/0307225 A1 | 12/2008 | Busser et al. | |
| 2010/0138908 A1* | 6/2010 | Vennelakanti | G06F 21/33 726/11 |
| 2012/0102546 A1 | 4/2012 | Jiang et al. | |

FOREIGN PATENT DOCUMENTS

| | | |
|---|---|---|
| EP | 2053777 A1 | 4/2009 |
| WO | WO2008130191 A1 | 10/2008 |
| WO | WO 2008130191 A1 | 10/2008 |

OTHER PUBLICATIONS

Non-English Chinese Office Action dated May 7, 2020 for Application No. 201680078882.0.

* cited by examiner

FIG 7

METHOD FOR VERIFYING A SECURITY CLASSIFICATION OF A FIRST DEVICE USING A DIGITAL CERTIFICATE, A FIRST AND SECOND DEVICE AND CERTIFICATE ISSUING APPARATUS

CROSS-REFERENCE TO RELATED APPLICATIONS

This application claims priority to PCT Application No. PCT/EP2016/082310, having a filing date of Dec. 22, 2016, based on German Application No. 10 2016 200 382.8, having a filing date of Jan. 14, 2016, the entire contents both of which are hereby incorporated by reference.

FIELD OF TECHNOLOGY

The following relates to a method for verifying a security classification of a first device using a digital certificate. The following relates, in addition, to a device configured as a first and/or a second device, wherein a first device has an identifier of the security classification in a digital certificate and wherein a second device can verify the identifier of the security classification of the first device. In addition, the application relates to a certificate issuing apparatus for issuing a digital certificate having an identifier of a security classification, and to a computer program product (non-transitory computer readable storage medium having instructions, which when executed by a processor, perform actions) for performing the method.

BACKGROUND

In installations and systems, components and devices are increasingly used that have to fulfill a particular security classification, also called security level. Such security classifications can be acquired, for example, by means of certification according to criteria, as are defined in standards of the International Organization for Standardization (ISO) 15408 (common criteria) or of the International Electrotechnical Commission (IEC) 62443-3-3 or 62443-4-2, for example. Security classifications can alternatively be assigned according to customer requests or according to other certification standards such as e.g. NERC CIP (North American Electric Reliability Corporation Critical Infrastructure Protection) or WIB (The International Instrument Users Association) or Wurldtech. Certification of devices is typically important to planning for selecting suitable components or else architectural design. In the course of operation, check seals or the like, for example, can indicate certification. The device itself typically has no self-awareness of its own security classification and thus also cannot pass the latter on to communication partners. In particular during an autoconfiguration, it may be necessary to check whether the security classification of a device is compatible with the security classification of the zone in which it is supposed to be incorporated.

SUMMARY

An aspect relates to a device with this "awareness" of the achieved security classification and then to use this security classification in different phases of the incorporation of the device into an installation network or during communication with other devices in an installation network.

The method according to embodiments of the invention for verifying a security classification of a first device using a digital certificate comprises sending a digital certificate having an identifier of the security classification from the first device for authentication to a second device, checking the identifier of the security classification against a predetermined security rule by means of the second device, and performing security measures in accordance with the check result for the security rules.

In automation applications, digital certificates and associated private keys are increasingly used for authenticating devices. These digital certificates usually have a format stipulated by means of a standard and contain data regarding the device, such as, for example, the manufacturer, type or serial number thereof, or else information regarding device addresses, such as, for example, the allocated IP address or MAC address. A digital certificate is extendable, however, and is extended according to embodiments of the invention by an identifier of a security classification. This extension of the certificate is additionally evaluated and compared against a prescribed security rule, for example a local or network-wide security policy, during an authentication of the first device. Therefore, the security classification of the first device is passed on to second devices as part of the communication and is available on said devices for verification.

In an advantageous embodiment, the digital certificate having an identifier of the security classification is provided to the first device, in particular during manufacture or startup of the first device.

This has the advantage that, by way of example, during the manufacture of the first device, a production device requests the certificate on behalf of the first device. In particular, such a production device can request a certificate having an applicable identifier of the security classification on behalf of a multiplicity of first devices. Therefore, the first device does not itself have to take action to acquire an identifier of the security classification. The method is therefore also usable for devices of simple structure.

In an alternative embodiment, the first device itself requests issue of an identifier of the security classification in a digital certificate from a certificate issuing apparatus.

This has the advantage that even changes, for example to the firmware or software or else hardware, made to the first device after production can be taken into consideration when issuing the identifier of the security classification.

In a further embodiment, the first device requests issue of an identifier of the security classification in an attribute certificate, associated with the digital certificate of the first device, from a certificate issuing apparatus.

When the security classification is entered into an attribute certificate, the validity period of the attribute certificate may differ from that of the actual certificate. By way of example, the digital certificate of the device can be issued with a long term and the attribute certificate having the associated security classification can be issued for a short life span or coupled to a particular verification cycle. This is comparable with a vehicle registration certificate, which is issued for a long life span, and a technical inspection certificate or other certification document, which is verified and reassigned for a short life span or in a fixed cycle. In addition, the certificate and the associated attribute certificate can also be issued by different issuing centers. By way of example, a device certificate with a long life span from a manufacturer can also be extended with an attribute certificate from an operator. Permissible combinations of different certificate issuing apparatuses are described in the security guideline in this case, for example.

In an advantageous exemplary embodiment, a request message for issue of the digital certificate is used to transmit security information of the first device to the certificate issuing apparatus.

This has the advantage that the conventional process for issuing a digital certificate is retained. The security information is transmitted directly to the certificate issuing apparatus and can be verified there or in a separate upstream verification apparatus, and an identifier of the security classification can be derived therefrom and inserted into the certificate to be issued.

In a further advantageous embodiment, the first device ascertains the security information itself and enters it into the request message.

The security information of the first device may, by way of example, be available as project planning information in a project planning server of an installation and can be retrieved therefrom and inserted into the request message. The security information of the first device as provided by a server can differ from the actual configuration of the first device, however, for example if the first device was updated or reconfigured between project planning and implementation with new software or with new application programs. Thus, it is advantageous if the first device ascertains the security information itself and is therefore based on the current device state.

In a variant, during envisaged use of the certificate, the first device checks its device integrity, e.g. by comparing the ascertained checksum of its firmware with a reference checksum of the firmware. The certificate is used by the first device only in the event of a successful test. The effect achieved by this is that the digital certificate of the first device having the security information is used by the first device only if the device also still has the firmware on which issue of the certificate is based when the certificate is used.

In an advantageous embodiment, the security information is information regarding the software level, in particular a version, a hash value or a digital signature of the software level or an attestation of the integrity of the software of the first device or an attestation of a configuration of the first device.

This has the advantage that the actual software level is used to ascertain the security classification. The software level is understood in this case to mean not only a version of the current software but also information regarding firmware, the implemented applications and the configuration data in general. An attestation of the software or the configuration can additionally be issued and cryptographically protected by a trusted body, such as, for example, a trusted platform module (TPM), and can therefore be assumed to be particularly reliable and secure. This information is inserted into a certificate request message and transmitted to the certificate issuing apparatus in order to ascertain the security classification. Preferably, a time stamp indicating the time of the integrity check is additionally included.

In an advantageous embodiment, the certificate issuing apparatus issues a certificate only in the event of a positive check result. Alternatively, the certificate issuing apparatus also issues a certificate, which then contains a prescribed value of the identifier of the security classification, in the event of a negative check result.

If a certificate is issued only in the event of a positive verification on the security information, the first device subsequently cannot start authenticated communication, of whatever kind, with another second device. Such a measure is advantageous in high security zones, in particular, since a first device of this kind is blocked completely. If, on the other hand, a certificate having a particular prescribed value for the identifier of the security classification is issued in the event of a negative test result, then the second device itself can verify whether and for what purpose a communication with the first device is permitted.

In an advantageous embodiment, the identifier of the security classification is inserted as an extension data structure in the digital certificate or as an extension data structure into an attribute certificate associated with the digital certificate.

An extension data structure is provided in the standards for digital certificates and therefore easily usable for using the security classification. The definition of an X.509 extension data structure, for example, provides the option of inserting this extension directly into an X.509certificate or into an associated attribute certificate.

In an advantageous embodiment, the identifier of the security classification is a flag that merely confirms a successful check. The identifier of the security classification may alternatively be a data structure containing information about the verified security information.

This allows verification of different accuracy on the security classification depending on the security requirement in the communication network of the industrial installation.

In an advantageous embodiment, the extension data structure additionally contains information regarding the security rule on which the security classification is based and/or information about a verification body performing the check for the certificate issuing apparatus and/or a validity period of the security classification and/or a statement of intended use.

The security guideline maps the required security classification of the devices in the overall architecture. The indication of the underlying security guideline makes it possible to check whether the device meets a particular demanded guideline.

In an advantageous embodiment, the identifier of the security classification is verified in a second device within the context of an authentication of the first device during a connection setup, or is verified during a request for service discovery in a network or during an autoconfiguration of the first device in a security zone of a network or is used for selection of a network filter rule, also called network policy.

A first device according to embodiments of the invention for operation in an installation communication network contains an ascertainment unit configured so as to ascertain security information. In addition, the first device comprises a requesting unit configured so as to enter the security information into a request message and to output the request message for issue of a digital certificate having an identifier of the security classification.

A first device is therefore capable of requesting a certificate that, in addition to the usual attributes of the first device, contains a security classification in the form of an identifier or an extension of the usual certificate.

In an advantageous embodiment, the ascertainment unit is configured so as to ascertain the security information from information contained in the device itself. Such information is, in particular, information regarding the software level of the first device, preferably a version, a hash value, a digital signature of the software level or an attestation of a configuration of the first device or an attestation of the integrity of the first device or an attestation of a configuration of the first device.

This allows verification not only of the software level of the planned device, for example, but also the integrity of the current software level or the configuration of the first device at the time of the request for the certificate.

A second device according to embodiments of the invention comprises a reception unit configured so as to receive a digital certificate having an identifier of the security classification, a verification unit configured so as to verify the identifier of the security classification and a performance unit configured so as to perform security measures in accordance with a verification result based on security rules.

This has the advantage that the second device can now take a current security classification as a basis for verifying and complying with a prescribed security policy. Therefore, a security policy can be implemented effectively.

In an advantageous embodiment, the second device is configured so as to verify the received identifier of the security classification of a first device within the context of an authentication during a connection setup to the second device or within the context of a request for service discovery in a network or during a request for configuration data by a first device for integration into a security zone of a network or during a connection setup request for ascertaining network filter rules.

The security classification can therefore perform different tasks within a network easily based on security rules.

A certificate issuing apparatus according to embodiments of the invention for issuing a digital certificate having an identifier of a security classification contains a verification unit configured so as to test security information received in a certificate request message against a prescribed security guideline, and an issuing unit configured so as to insert an identifier, ascertained therefrom, of a security classification into the digital certificate.

Such a certificate issuing apparatus therefore performs additional validation of the security information and hence, by way of example, of a software level or a configuration of the device against a prescribed security guideline or project running data.

In an advantageous embodiment, the certificate issuing unit is configured so as to output the identifier of the security classification as an extension data structure in the digital certificate or into an attribute certificate associated with the digital certificate.

The certificate issuing unit confirming the identifier of the security classification as an extension data structure in an attribute certificate may be different than the certificate issuing unit issuing the digital certificate of the device. Permissible combinations of different certificate issuing units are described in the security guideline in this case.

In addition, a computer program product is claimed that is loadable directly into a first device, into a second device and into a certificate issuing apparatus and comprises program code portions suitable for performing the steps of the cited method.

BRIEF DESCRIPTION

Some of the embodiments will be described in detail, with references to the following Figures, wherein like designations denote like members, wherein.

DETAILED DESCRIPTION

Each of the corresponding parts are provided with the same reference signs in all figures.

In installations and systems, in particular in industrial and automation installations, such devices as are consistent with a particular security level are increasingly used. Such security classifications can be assigned by means of certification according to criteria from security standards or by means of customer requirements. This certification of the devices is typically important for planning, that is to say for the selection of suitable components or else for architectural design. Devices to date carry check seals or the like, for example, which indicate this certification. At present, it is possible for such assigned security classifications to be evaluated and taken into consideration in ongoing processes only to a very limited extent.

The devices are usually connected to one another via a communication network. In this communication network, messages are transmitted between servers and the devices, for example in order to configure or control the individual devices. Communication between the individual devices also takes place, for example in order to transmit status messages or measured values.

Figure 1:
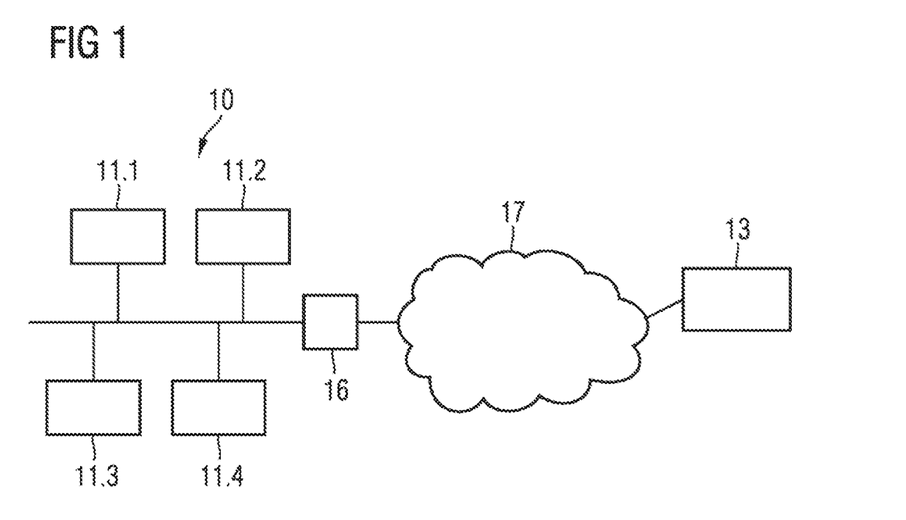
FIG. 1 shows a schematic depiction of an installation communication network in which the method according to embodiments of the invention is performed.

FIG. 1 shows a typical application scenario. In an installation communication network 10, a multiplicity of devices 11 are connected to one another. Besides field devices 11.1, 11.2, it is also possible for control servers 11.3 or configuration servers 11.4 to be incorporated. A gateway unit 16, also called a gateway, supervises the data transmission to other domains of the communication network 10 or to external or public networks 17, such as the Internet. A certificate issuing apparatus 13 is connected to the installation communication network 10 via a gateway 16 and, by way of example, the Internet.

The devices 11 and also the gateway 16 communicate using a cryptographically protected communication protocol, for example a TLS (Transport Layer Security) or the Internet security protocol IPsec/IKEv2. To authenticate the communication partners, digital certificates are used in this case. By way of example, these digital certificates contain data of the devices, such as, for example, details regarding the manufacturer, a type indication, a serial number or else address information.

Figure 2:
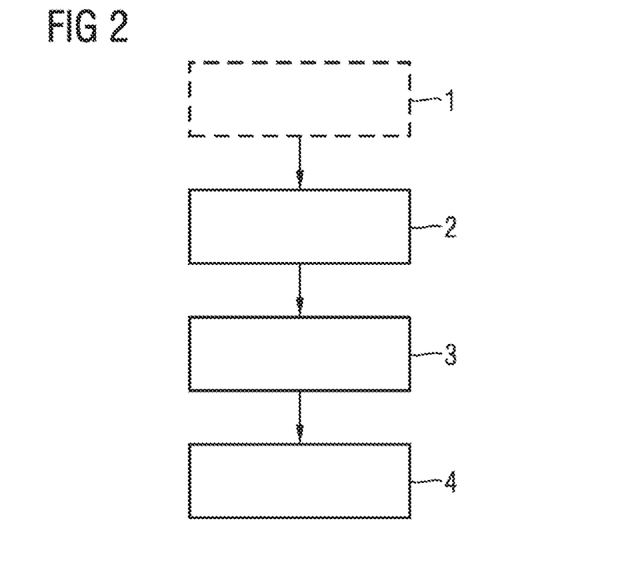
FIG. 2 shows an exemplary embodiment of the method according to embodiments of the invention as a flow chart.

A digital certificate is requested from a certification apparatus by means of a certificate request. So as now to be able to take into consideration a security classification of a device within the installation or during the incorporation and communication of a device, a method that is schematically depicted in FIG. 2 is proposed.

In method step 2, a first device 11.1 sends a digital certificate having an identifier of a security classification to a second device 11.2. In the second device 11.2, for example during the authentication of the first device 11.1, the security classification is compared against a, by way of example, local security policy, see method step 3. Depending on the verification result and the security policy or security rules to be applied, security measures are now performed, see method step 4.

The digital certificate having the identifier of the security classification can be provided to the first device by a central body during the actual production or when the first device is implemented in a communication network 10. Alternatively, the first device 11.1 itself requests from a certificate issuing apparatus 13, see FIG. 1, issue of an identifier of the security classification in a digital certificate, see first method step 1 in FIG. 2. To this end, security information of the first device 11.1 is entered into the request message. A verification apparatus checks the details in the request message and, in the event of a positive check result, forwards the message to the issuing apparatus 13. The verification apparatus is either integrated in a certificate issuing apparatus 13, see FIG. 3, or configured as a separate apparatus, see verification apparatus 14 in FIG. 4. The certification apparatus 13, 15 now issues a digital certificate 30, for example according to the X.509 standard, and preferably uses an extension data structure in the certificate to code an identifier of the security classification.

Figure 3:
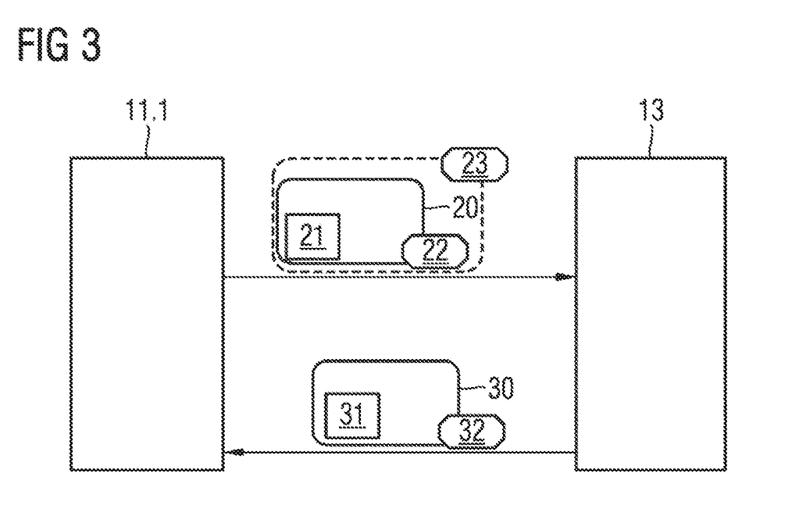
FIG. 3 shows a schematic depiction of a first exemplary embodiment of the cycle of an instance of issue of a digital certificate having the identifier of a security classification.
Figure 4:
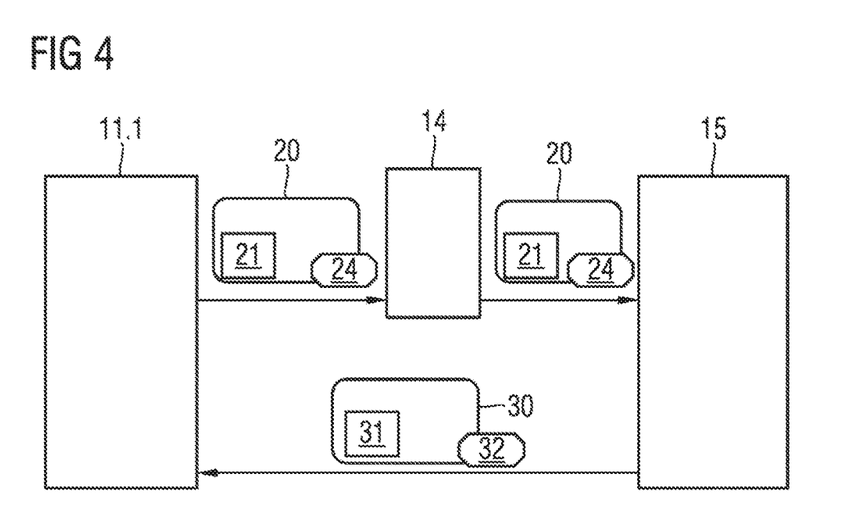
FIG. 4 shows a second exemplary embodiment of the cycle of the issue of a digital certificate with separate verification and certificate issuing apparatuses.

The certificate issuing apparatus 13, 15 transmits the accordingly extended certificate 30 back to the first device 11. Alternatively, the identifier of the security classification 31 can be inserted into an attribute certificate associated with the digital certificate, in particular as an extension data structure, and transmitted.

FIGS. 3 and 4 now explain the first method step, namely the requesting of an identifier of the security classification in the digital certificate 30 from a certificate issuing apparatus 13 by the first device 11.1, in more detail. An important aspect in this case is now that during the issue of the certificate 30 for the first device 11.1, there is the assurance that the information that the certificate request message 20 contains about the first device 11.1, such as, for example, the manufacturer, the type, the serial number, a network address or else the actual, current software level, is correct. Based on the security information 21 that the request message 20 contains for the first device 11.1, it is then possible for the applicable security classification to be ascertained and signed for a verification unit of the issuing apparatus 13.

The request message 20 contains the security information 21 as an attribute, for example. The request message 20 is transmitted to the issuing apparatus 13 in a manner protected with a cryptographic checksum 22 via the request message or with a digital signature 24 of the first device 11.1. In this regard, it is possible for the key from a device manufacturer certificate, which is usually assigned during the production of a device 11.1, to be used, for example.

In a variant in which the request message is produced according to an SCEP protocol, for example, the first device 11.1 uses a password in order to authenticate and authorize the request message 20. In this case, the password is transmitted as an attribute, but the password is not adopted as an attribute in the issued certificate. The request message 20 is additionally packed into a specific data structure, for example according to the PKCS #7 standard, in this case. This is depicted by a dashed line around the request message 20 in FIG. 3. The request message 20 is therefore encrypted in order to protect confidentiality. Accordingly, it would also be possible for an "XML encryption" to be used, for example.

The request message is transmitted to a verification unit of the issuing apparatus 13 or to an upstream separate verification apparatus 14, as depicted in FIG. 4. There, the request message 20 is verified. That is to say that the security information 21 is checked against configuration or implementation data or against the security guideline and an appropriate identifier of a security classification is confirmed or inserted into the digital certificate. In FIG. 3, the request message 20 is forwarded under the protection of the digital signature 24 to the issuing apparatus 15.

The issuing apparatus 13, 15 now issues an appropriate certificate 30 and returns it, signed with the signature 32 of the certification body 13, 15, to the first device 11.1. The certificate 30 now comprises the identifier of the security classification 31, for example in the form of an extension data structure. Alternatively, the issuing apparatus 13, 15 can also issue an attribute certificate with the appropriate extension data structure having the identifier of the security classification 31.

As security information 21, the first device 11.1 enters a prescribed security classification or information from which the security classification can be derived into the request message. Such security information 21 is, by way of example, information regarding the software level of the first device 11.1, such as, for example, a version of the software level, or else an attestation of the integrity of the software of the first device 11.1. The security information can alternatively indicate a configuration of the first device 11.1. An attestation of the integrity of the software or of the device configuration is determined on the basis of at least one portion of the device software or configuration information in this case and transmitted as an attribute, for example, together with the request message. The attestation of the integrity may be a flag indicating a successful integrity check. Preferably, however, integrity information is contained that is determined on the basis of the content of the device software, such as, for example, a hash value or the content of a platform configuration register. The security information is preferably protected by a cryptographic checksum, for example by a digital signature or a message authentication code. It is also possible for an attestation of a trusted platform module (TPM) to be coded into the request message. Preferably, a time statement is additionally contained that indicates the time of the integrity check.

The verification unit 13, 14 checks the security information 21 contained. Only if this information is valid is an appropriate device certificate issued. The check is deemed successful if the value of the security information matches an admissible value or if an appropriate flag is present, for example. The issuing apparatus 13, 15 can issue a certificate 30 only in the event of a successful check, or alternatively can issue a certificate 30 in the event of a negative check result, but then with a prescribed value for the identifier of the security classification. The certificate 17 having the security classification 19 is received by the first device 11.1 and subsequently used for authentication.

The identifier of the security classification in the certificate or in the attribute certificate forces validation in accordance with the indicated security classification. Improper use of the device, which is intended for use in an application context with a particular security classification, is prevented thereby.

The extension data structure can contain not only the identifier for the security classification but also further information, for example regarding the certification standard on which the security classification is based. In addition, the extension data structure can contain information regarding a verifier of the security classification. The verifier entered may be the certificate issuing apparatus or the executing verification apparatus or an identifier of a superordinate checking unit, for example. Similarly, a validity period of the security classification and/or a statement of intended use may be contained. One or else more identifiers of the security classification may be contained, for example for classifications according to different standards, or if multiple security classifications of a standard are met.

As an example, a digital certificate (structure 1) and an attribute certificate (structure 2) having an identifier of the security classification are depicted below, in each case in the form of an extension data structure in an X.509 certificate, in ASN.1 notation.

```
Certificate                    ::=    SEQUENCE {
        tbsCertificate                TBSCertificate,
        signatureAlgorithm            AlgorithmIdentifier,
        signatureValue                BIT STRING }
TBSCertificate ::= SEQUENCE {
        version                       [0] Version must be v3,
        serialNumber                  CertificateSerialNumber,
        signature                     AlgorithmIdentifier,
        issuer                        Name,
        validity                      Validity,
        subject                       Name,
        subjectPublicKeyInfo          SubjectPublicKeyInfo,
        issuerUniqueID                [1] IMPLICIT UniqueIdentifier OPTIONAL,
                                      -- If present, version MUST be v2 or v3
        subjectUniqueID               [2] IMPLICIT UniqueIdentifier OPTIONAL,
                                      -- If present, version MUST be v2 or v3
        extensions                    [3] EXPLICIT Extensions OPTIONAL
                                      -- If present, version MUST be v3
}
Validity ::= SEQUENCE {
        notBefore       Time,
        notAfter        Time }
Time ::= CHOICE {
        utcTime         UTCTime,
        generalTime     GeneralizedTime }
                                                              (Structure 1)
    AttributeCertificate::= SEQUENCE {
        Acinfo                        AttributeCertificateInfo,
        signatureAlgorithm            AlgorithmIdentifier,
        signature                     Value BIT STRING
        }
    AttributeCertificateInfo::= SEQUENCE {
        version                       AttCertVersion -- version is v2,
        holder                        Holder,
        issuer                        AttCertIssuer,
        signature                     AlgorithmIdentifier,
        serialNumber                  CertificateSerialNumber,
        attrCertValidityPeriod        AttCertValidityPeriod,
        attributes                    SEQUENCE OF Attribute,
        issuerUniqueID                UniqueIdentifier OPTIONAL,
        extensions                    Extensions OPTIONAL
        }
    Attribute::= SEQUENCE {
        Type                          AttributeType,
        values                        SET OF AttributeValue
                                      -- at least one value reqrd.
        }
    AttributeType::= OBJECT IDENTIFIER
    AttributeValue::= ANY DEFINED BY AttributeType               (Structure 2)
```

The extension data structure is denoted by "extensions" in each case. Such an extension, which reproduces the security classification of a device and also contains additional information about the checking device or the organization that performed the verification, and supplementary information such as a statement of purpose, is depicted below under the designation "id-on-SecLevel" in structure 3.

```
    id-on-SecLevel OBJECT IDENTIFIER ::= { id-on 3 }
SecurityLevel      ::= SEQUENCE {
   secLevel        Name -- may be an alphanumerical description
   relBase         Name -- name of standard or regulation
                        or requirement document
   verifier        Name -- verifier of security level
   scope           Name -- description of overall system or
                        plant or facility
}
                                                   (Structure 3)
```

The security classification is denoted by "SecurityLevel" here and, in the "secLevel" parameter, indicates an identifier or an alphanumeric description of the security classification. The identifier may be a flag, for example, that merely confirms the presence of a particular prescribed security classification. The identifier of the security classification may alternatively be a data structure comprising further information, for example about verified security information that the request message contained.

"relBase" denotes the underlying security guideline. The "verifier" parameter indicates the verifier, for example the verification apparatus. The "scope" parameter and the statement of purpose of the component, for example the name of the automation installation an in which the device is installed.

Said security guideline maps the required security classification of the components of the overall architecture. If, by way of example, a communication link is set up and a first device 11.1 authenticates itself with a certificate, then the communication partner, for example a second device 11.2, can validate not only the certificate but also whether the communication partner is consistent with the requisite security classifications.

In a second device 11.2 receiving a certificate from a first device 11.1, the authentication now first of all results in the certificate 30 being checked. If the check is not successful, an error message is output. If the check is successful, on the other hand, a check is first of all performed to determine whether an extension data structure, in particular with an identifier of the security classification, is present. If no such classification is present, only the functions for which no security classification is necessary are performed. In the extreme case, no function is performed and the action is rejected or acknowledged with an error message. If an extension data structure is present, on the other hand, security classification 31 in the certificate 30 is compared with the security guideline appropriate for the requisite action (connection setup, configuration, etc.) and executed in accordance with the security guideline. If the security classification 31 is not consistent with the specifications, an error message or a particular configuration or a network filter rule, etc. is set up in accordance with the security classification 31, for example.

Security measures performed in accordance with the verification result are rejection of a connection request from a first device 11.1 on a second device 11.2, for example. During connection setup using a TLS protocol, for example, the authentication involves the certificate being checked but rejected as invalid owing to inadequate security classification, for example, and therefore the whole communication link being rejected. Depending on the check result for the identifier of the security classification, a network filter rule can be dynamically used. The information of the security classification can be used as part of a service discovery, in order to look for a device, for example for diagnosis or for control, that fulfilled a particular security classification. Depending on the check result for the identifier of the security classification, a first device 11.1 can be incorporated in a security zone only if it fulfils the security classification of the zone.

Figure 5:
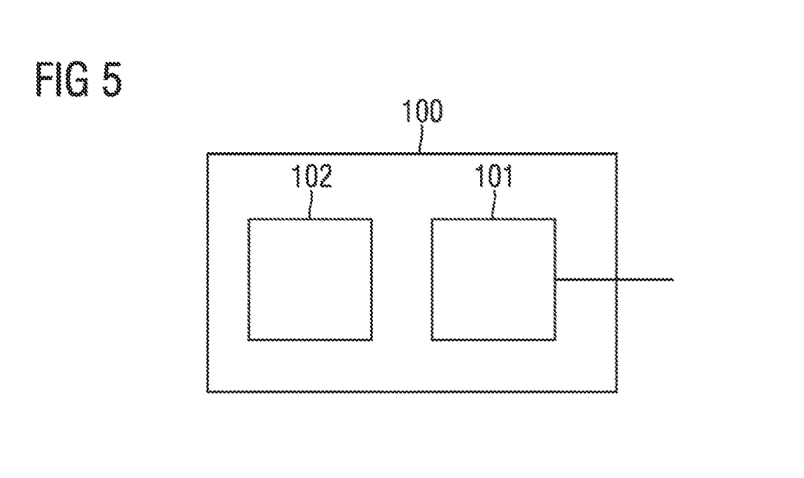
FIG. 5 shows a block diagram of an exemplary embodiment of a first device according to embodiments of the invention.

FIG. 5 shows an exemplary embodiment of a first device 100 used for operation in an installation communication network. The first device 100 comprises a request unit 101 configured so as to enter the security information 21 into a request message 20 and to output the request message 20 for issue of a digital certificate 30 having an identifier of the security classification 31. In addition, the first device 100 contains an ascertainment unit 102 by means of which security information 21 is ascertainable that is then inserted into the request message by the requesting unit 101. The ascertainment unit 102 is additionally configured so as to ascertain the security information 21 from information contained in the device 100 itself.

Figure 6:
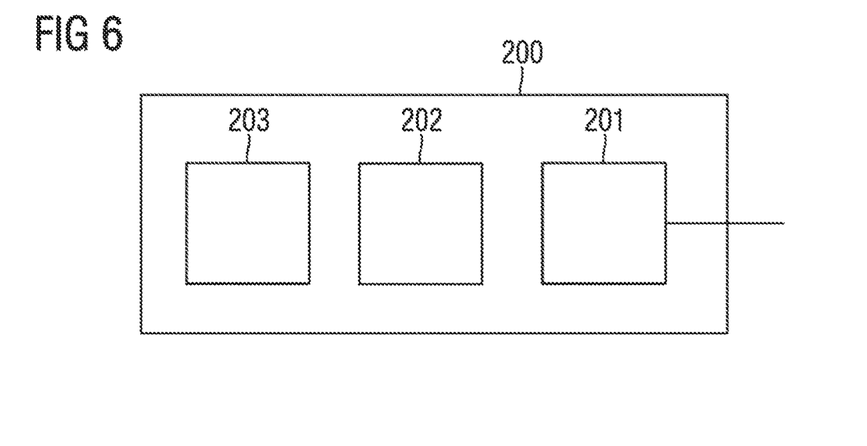
FIG. 6 shows a block diagram of an exemplary embodiment of a second device according to embodiments of the invention.

FIG. 6 depicts a second device 200 configured so as to evaluate a certificate 30 having an identifier of the security classification 31 and to ascertain and perform appropriate measures.

The second device 200 comprises a reception unit 201 configured so as to receive a digital certificate having an identifier of the security classification. It comprises a verification unit 202 configured so as to verify the identifier of the security classification 31. In addition, it comprises a performance unit 203 configured so as to perform the security measures in accordance with a verification result on the basis of security rules.

Figure 7:
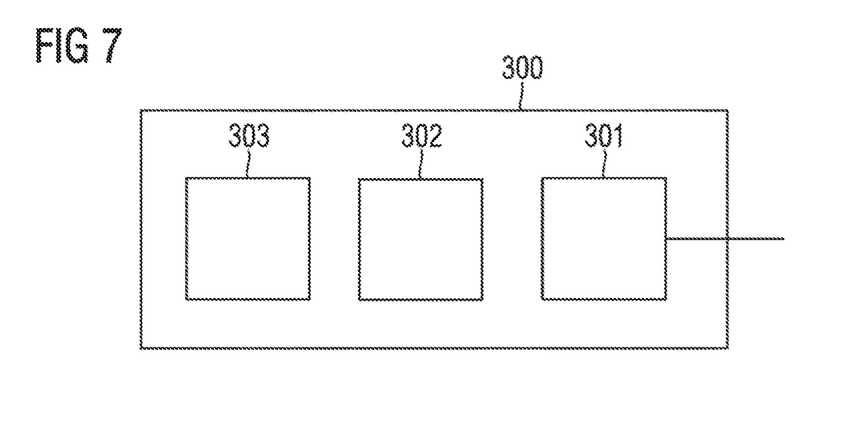
FIG. 7 shows a block diagram of an exemplary embodiment of a certificate issuing apparatus according to embodiments of the invention.

FIG. 7 depicts a certificate issuing apparatus for issuing a digital certificate 30 having an identifier of a security classification 31. The issuing apparatus 300 contains an input unit 301 that either receives a certificate request message directly from a first device 100 or already receives a verified certificate request message 20 from a separate or upstream verification apparatus. In addition, the issuing apparatus 300 contains a checking unit 302 configured so as to test security information received in a certificate request message against a prescribed security guideline. In addition, the issuing apparatus 300 comprises an issuing unit 303 configured so as to insert an identifier, ascertained therefrom, of a security classification 31 into the digital certificate 30. An issuing unit 303 is used to insert the identifier of the security classification 31 as an extension data structure in the digital certificate 30 or into an attribute certificate associated with the digital certificate 30.

Information about the software level of the first device can also be verified independently of the request for an identifier of the security classification during a request for issue of a certificate. In this case, not only the information about the software level is checked against setpoint information and a certificate is issued only in the event of a successful check result. Optionally, the issued certificate may also contain information regarding the check result. Cryptographic protection of the request message can be performed by checksum or digital signature, for example, in accordance with the requirement of an identifier of a security classification. The information regarding the check result for the information of the software level is interpreted differently from the identifier of the security classification in this case. Information regarding the check result for the software level can also be entered into a certificate of a first device in addition to an identifier of the security classification.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for verifying a security classification of a first device using an associated digital certificate, comprising the steps of:
    sending, by the first device, a digital certificate having an identifier of the security classification from the first device to a second device,
    verifying, by the second device, the identifier of the security classification against a prescribed security rule of a local or network-wide security policy that indicates a required security classification of all devices in an installation communication network,
    performing, by the second device, security measures in accordance with the verification result for the prescribed security rule of a local or network-wide security policy that indicates a required security classification of all devices in an installation communication network local or network-wide security policy, wherein the security measures include use of a network filter rule,
    wherein the first device transmits a request message to a certificate issuing apparatus, wherein the request message contains security information of the first device, wherein the security information includes at least one of (a) a software level of the device including at least one of a version of the current software of the first device, firmware information of the first device, and implemented applications of the first device, (b) a hash value of the first device, (c) a digital signature of the software level, (d) an attestation of the integrity of the current software of the first device, and (e) an attestation of a configuration of the first device,
    wherein the request message requests issue of the identifier of the security classification in-the digital certificate from the certificate issuing apparatus, wherein the security classification is based on a check of the security information against the local or network-wide security policy that indicates a required security classification of all devices in an installation communication network,
    wherein the identifier of the security classification is inserted as an extension data structure into an attribute certificate associated with the digital certificate such that a validity period of the attribute certificate can differ from that of the digital certificate, and
    wherein the identifier is a data structure containing information about the security information such that the security classification of the first device is verifiable depending on required security classifications of the installation communication network.

2. The method as claimed in claim 1, wherein the digital certificate having the identifier of the security classification is provided to the first device, in particular during manufacture or startup of the first device.

3. The method as claimed in claim 1, wherein the first device requests issue of the identifier of the security classification in an attribute certificate, associated with the digital certificate of the first device, from the certificate issuing apparatus.

4. The method as claimed in claim 1, wherein the first device ascertains the security information itself and enters it into the request message, in the form of an attribute.

5. The method as claimed in claim 1, wherein the certificate issuing apparatus issues a digital certificate having the applicable identifier of the security classification and transmits the digital certificate to the first device.

6. The method as claimed in claim 5, wherein the certificate issuing apparatus issues a certificate only in the event of a positive check result or wherein the certificate issuing apparatus issues a certificate containing a prescribed value of the identifier of the security classification even in the event of a negative check result.

7. The method as claimed in claim 1, wherein the extension data structure contains, in addition to the identifier of the security classification, information regarding the security guideline on which the security classification is based and/or contains information regarding a verification apparatus performing the check for the certificate issuing apparatus and/or contains a validity period of the security classification and/or a statement of intended use.

8. The method as claimed in claim 1, wherein the identifier of the security classification is verified in a second device within the context of an authentication of the first device during a connection setup, or is verified during a request for service discovery in a network or during an autoconfiguration of the first device in a security zone of a network or is used for selection of a network filter rule.

9. A computer program product, comprising a computer readable hardware storage device having computer readable program code stored therein, said program code executable by a processor of a computer system to implement a method loadable directly into a programmable microprocessor, comprising program code portions suitable for performing the steps of the method as claimed in claim 1.

10. A certificate issuing apparatus for issuing a digital certificate having an identifier of a security classification, containing
    a verification unit configured so as to check security information of a first device received in a certificate request message against a prescribed local or network-wide security policy that indicates the required security classification of all devices in an installation communication network, to determine a security classification of the first device, wherein the security information includes at least one of (a) a software level of the device including at least one of a version of the current software of the first device, firmware information of the first device, and implemented applications of the first device, (b) a hash value of the first device, (c) a digital signature of the software level, (d) an attestation of the integrity of the current software of the first device, and (e) an attestation of a configuration of the first device, and
    an issuing unit configured so as to insert an identifier of the security classification of the first device into the digital certificate, wherein the identifier of the security classification is derived by the certificate issuing apparatus from a result of the check by the verification unit, wherein the issuing unit is configured so as to insert and output the identifier of the security classification as an extension data structure into an attribute certificate associated with the digital certificate such that a validity period of the attribute certificate can differ from that of the digital certificate, and wherein the identifier is a data structure containing information about the security information such that the security classification of the first device is verifiable depending on required security classifications of the installation communication network.

11. An installation communication network system comprising:

a first device for operation in an installation communication network containing:

an ascertainment unit configured to ascertain security information of the first device, wherein the security information includes at least one of (a) a software level of the device including at least one of a version of the current software of the first device, firmware information of the first device, and implemented applications of the first device, (b) a hash value of the first device, (c) a digital signature of the software level, (d) an attestation of the integrity of the current software of the first device, and (e) an attestation of a configuration of the first device, and a requesting unit configured to enter the security information into a request message, and to output the request message to a certificate issuing apparatus for issue of a digital certificate having an identifier of a security classification of the first device, wherein the security classification is based on a check of the security information against a prescribed local or network-wide security policy that indicates the required security classification of all devices in an installation communication network, and wherein the identifier is one of a flag confirming a successful check, or a data structure containing information about the security information such that the security classification is verifiable depending on required security classifications of the installation communication network;

a second device, comprising:

a reception unit configured to receive the digital certificate having an identifier of the security classification, a verification unit configured so as to verify the identifier of the security classification, and a performance unit configured so as to perform security measures in accordance with a verification result of the verification unit using security rules, wherein the security measures include use of a network filter rule; and the certificate issuing apparatus for issuing the digital certificate having the identifier of the security classification, containing:

a second verification unit configured to check the security information received in the certificate request message against the prescribed local or network-wide security policy, and an issuing unit configured to insert the identifier, ascertained therefrom by the certificate issuing apparatus, of the security classification of the first device into the digital certificate, wherein the issuing unit is configured so as to insert and output the identifier of the security classification as an extension data structure into an attribute certificate associated with the digital certificate such that a validity period of the attribute certificate can differ from that of the digital certificate, and wherein the identifier is a data structure containing information about the security information such that the security classification of the first device is verifiable depending on required security classification of the installation communication network.

12. The installation communication network system of claim 11, wherein the ascertainment unit is configured to ascertain the security information from information contained in the first device itself.

13. The installation communication network system of claim 11, wherein the second device is configured to verify the received identifier of the security classification:

within the context of an authentication of the first device during a connection setup to the second device, or within the context of a request for service discovery in a network and/or during a request for configuration data by the first device for integration into a security zone of a network and/or during a connection setup request for ascertaining network filter rules.

* * * * *